(12) United States Patent
Roylance

(10) Patent No.: US 7,480,072 B2
(45) Date of Patent: Jan. 20, 2009

(54) EFFICIENT AND FLEXIBLE MULTI-BIT HALFTONING

(75) Inventor: Eugene A. Roylance, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1725 days.

(21) Appl. No.: 09/942,293

(22) Filed: Aug. 29, 2001

(65) Prior Publication Data

US 2003/0043412 A1    Mar. 6, 2003

(51) Int. Cl.
*G06K 15/00* (2006.01)

(52) U.S. Cl. .................................. 358/1.3; 358/3.2

(58) Field of Classification Search ............ 358/1.3, 358/3.06, 3.13, 3.14, 3.16, 1.9, 2.1, 3.2, 3.3, 358/534, 536; 382/266, 270
See application file for complete search history.

(56) References Cited

U.S. PATENT DOCUMENTS

| | | | | |
|---|---|---|---|---|
| 5,155,598 A * | 10/1992 | Ramekers et al. | ........... | 358/3.17 |
| 5,249,242 A * | 9/1993 | Hanson et al. | .............. | 382/269 |
| 5,515,480 A | 5/1996 | Frazier | ....................... | 395/109 |
| 5,581,372 A * | 12/1996 | Kerz | .......................... | 358/3.14 |
| 6,384,930 B1 * | 5/2002 | Ando | ........................ | 358/1.17 |
| 6,400,834 B1 * | 6/2002 | Murphy | ..................... | 382/112 |
| 2003/0043412 A1 * | 3/2003 | Roylance | ................... | 358/3.06 |

* cited by examiner

*Primary Examiner*—Jerome Grant, II

(57) ABSTRACT

An implementation of a technology, described herein, for efficient and flexible multi-bit halftoning on a marking device, such as a printer. At least one implementation of the technology, described herein, performs multi-bit halftoning with hardware (e.g., circuitry) rather than a programmable processor. Furthermore, at least one implementation performs multi-bit halftoning for a variable number of bits per pixel and a variable resolution. This abstract itself is not intended to limit the scope of this patent. The scope of the present invention is pointed out in the appending claims.

19 Claims, 3 Drawing Sheets

EFFICIENT AND FLEXIBLE MULTI-BIT HALFTONING

TECHNICAL FIELD

This invention generally relates to a technology for efficient and flexible multi-bit halftoning on a marking device, such as a printer.

BACKGROUND

In printing, when a continuous tone image (such as a photograph) is converted into a monotone medium (e.g., black-and-white) image, it is typically "halftoned." In a halftone process, a continuous tone image is converted to various apparent levels of gray using either patterns of monotone (i.e., single color) dots of various sizes or using lines of various widths. This halftone process may be called "halftoning." This process may be called "dithering."

Conventional Printing

In conventional printing (e.g., on a printing press), one way that halftones are created is by photographing an image through a screen (e.g., a filter). The screen frequency, measured in lines per inch, determines how many dots are used to make each spot of gray. In theory, the higher the screen frequency (the more lines per inch), the more accurate the halftone will be. However, actual screen frequencies are limited by the technology because higher screen frequencies create smaller, more tightly packed dots. If printing is being done on a low-resolution device, therefore, better results may occur with a lower screen frequency.

Electronic Displays

Electronic displays have the ability to display gray levels by varying the intensity of a dot, pel, or pixel produced in the display. However, most marking engines still provide only monotone output. Marking engines must therefore employ halftone techniques to simulate levels of gray. Examples of devices including marking engines are laser printers, LED printers, electrothermographic printers, copiers, multifunction devices, and the like. Monotone marking engines simulate levels of gray using clusters of dots or pixels, so that pixel locations in the cluster are marked (i.e., black or "on") or left blank (i.e., white or "off") in various patterns. The clusters are often referred to as halftone cells.

Raster of Shades of Gray

In a typical application, a monotone marking engine is utilized. Such a marking engine has a native resolution. For example, standard laser printers have specified native resolutions of 300, 600, 1200, or more dpi (dots per inch). The centers of the marking regions (i.e., pixel locations) for a 300 dpi device, for example, are located 1/300 of an inch apart in both the horizontal and vertical directions of the paper. Therefore, the native resolution of a marking engine may be represented by an orthogonal array of pixel locations. This array may be called a "raster." The two dimensional size of the array depends on the total paper size or output area of the graphic image.

A gray level (i.e., shade or tone) value is assigned to each pixel location in the array. This value is used in electronic displays (such as video displays, cathode ray tubes (CRTs), or liquid crystal displays (LCDs)) to control the intensity of the corresponding pixel. A conventional way of assigning gray values is to set the value of a multi-bit binary number for each pixel in the array. Such an array may be referred to variously as grayscale data, a grayscale array, or video raster data.

Simulated Grayscale

Ordinarily, the availability of grayscale data, alone, does not allow a marking engine to simulate the gray levels contained in the data. By its nature, a monotone marking engine cannot print actual shades of gray. It also cannot vary the intensity at each pixel location. Typically, it either marks the entire pixel region or leaves it blank.

In order to simulate gray levels, the monotone marking engine must use pixel clusters (i.e., halftone cells) formed of marked and blank pixels to provide a number of gray level patterns. The number of patterns available in a halftone scheme theoretically corresponds directly to the size of the pixel cluster. However, inherent properties of most marking engines reduce or limit the number of gray levels available in actual practice.

The best set of simulated gray levels are those that appear linear or smooth to a viewer. The process of selecting the best set of gray levels is called "tone curve generation." A tone curve is a representation of the gray levels selected, and tone curve generation is the process of selecting these values taking into account gamma correction, tone correction for the marking engine, and posterization (or image smoothness).

Sub-Pixel Marks

One approach to tone curve generation has been to reduce the pulse width that drives the imaging laser in a laser printer. Using the multi-bit (e.g., 4 bits) grayscale data of a pixel, the laser printer may create a dot (i.e., mark) that is smaller than a full size pixel, in the hope of providing a greater number of distinguishable gray levels. This smaller dot may be called a sub-pixel mark For example, a conventional marking engine divides the pixel period of the laser by sixteen, and provides sixteen different dot sizes or marks for any given pixel region. Usually, such dots are centered on the pixel region location. In such schemes, the laser is turned on by a pulse having duration between $0/15^{th}$ and $15/15^{th}$ of the pixel period, the pulse being centered in the pixel period interval. If grayscale data is provided with four bits per pixel gray values, sixteen different shades can be specified for each pixel. The size of the subpixel mark at each pixel region is controlled by such pulses in an attempt to simulate gray levels.

Furthermore, conventional marking engines can effectively place the subpixel mark within a pixel region. More precisely, they can position the center of a subpixel mark to a location within the pixel region other than the true center. For example, a small subpixel mark (e.g., $2/15^{th}$ of the pixel period) may be towards the right side of a pixel region.

Conventional Multi-bit Halftoning

Multi-bit halftoning is a technique for halftoning that takes advantage of the multi-bit grayscale data and a printer's ability to create subpixel marks. It further uses the printer's ability to control the size of the subpixel mark at a pixel region and to place a subpixel mark within a pixel region.

However, it is not a simple conversion from the multi-bit grayscale data to the halftone cell patterns. It is not a one-to-one conversion. As described above, the halftone cells are a cluster of pixels. The cells will not form a cohesive cluster if the pixels therein are partially formed. Therefore, multi-bit halftoning uses grayscale data from a collection of neighboring pixels to from the proper halftone cell pattern to simulate the level of gray.

An example of the conventional multi-bit halftoning technique is described in U.S. Pat. No. 5,515,480, entitled "System and Method for Enhancing Graphic Features Produced by Marking Engines," issued on May 7, 1996.

Limitations of Conventional Multi-bit Halftoning

Conventional multi-bit halftoning is slow and inefficient. It uses processors to calculate the conversion from multi-bit grayscale raster data into multi-bit halftones. Since processors are not specialized circuitry and since processors tend to execute a series of instructions, they are slower than a specialized circuitry (e.g., hardware) designed to do multi-bit halftone conversions.

Conventional multi-bit halftoning requires a memory (e.g., RAM) and intermediate steps of storing halftoned data in the memory and retrieving the data from the memory. This adds to the overall inefficiency of conventional multi-bit halftoning. Since the conventional conversion of grayscale to halftone generates multiple clusters, the memory temporarily stores the results of the conversion.

Furthermore, the conventional halftoning employs large look-up tables (LUTs). The large LUT consume additional memory. A LUT is table of values stored in a computer that is searched until a specified value is found. Searching for a value in a large LUT takes time. This time adds up quickly because this search is performed for each pixel. In addition, these LUT are typically quite large. The LUT takes a large amount of memory (e.g., RAM). That memory could otherwise be used to buffer page data. Compressed or reduced LUTs exist, but they require interpolation with complex mathematically computations.

Moreover, conventional multi-bit halftoning is inflexible. Each implementation is tailored for marking engines having a specific resolution. A conventional multi-bit halftoning system designed for a printer with a 600 dpi resolution would not have the flexibility to operate at 300 dpi.

Furthermore, each implementation of a conventional multi-bit halftoning system is tailored to convert from a specific "grayscale-depth" to the same "halftone-depth." Grayscale-depth is the number of bits per pixel for encoding grayscale for display (or storage) of a continuous tone image. Halftone-depth is the number of bits per pixel for encoding halftoning for printing of an image. For example, a conventional system may be designed to convert 4-bit grayscale data of an image into 4-bit halftone data. However, that same system cannot accommodate any other depth (e.g., 16-bit grayscale data or 8-bit grayscale data). Nor can it convert from one size grayscale-depth to another size halftone-depth.

Therefore, with conventional multi-bit halftoning, a user does not have the option to use a range of resolutions and/or a range of grayscale-depth.

The conventional solution to this problem is to design multiple implementations of the conventional multi-bit halftoning into a signal printer. Each implementation is designed to handle a specific combination of resolution and grayscale-depth. One can see that such a solution is inefficient and cumbersome.

Conclusion of Background

From the foregoing discussion, it is evident that the conventional art has failed to provide a mechanism for performing multi-bit halftoning that is efficient and flexible. All conventional systems rely on processors (with their bottlenecks) and large look-up tables (with their storage requirements). They use resources—such as memory—to temporarily store results. Consequently, they are slow and inefficient. All conventional systems are limited to a fixed number of bits per pixel (i.e., grayscale-depth and halftone-depth) and a fixed resolution. Consequently, they are inflexible.

Accordingly, what is needed is a fast and efficient technique for multi-bit halftoning. Perhaps, one is needed that does not rely on processors and large look-up tables. Moreover, what is needed is a flexible technique for multi-bit halftoning. One that can perform multi-bit halftoning for a variable number of bits per pixel and a variable resolution.

SUMMARY

Described herein is a technology for efficient and flexible multi-bit halftoning on a marking device, such as a printer. At least one implementation of the technology, described herein, performs multi-bit halftoning with hardware-based (e.g., circuitry) rather than a programmable processor. With both of these attributes, an implementation may lessen the need for expensive storage memory within the printer. Furthermore, at least one implementation performs multi-bit halftoning for a variable number of bits per pixel (i.e., grayscale-depth and halftone-depth) and a variable resolution.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of an Efficient and Flexible Multi-Bit Halftoning. The inventor intends these exemplary implementations to be examples. The inventor does not intend these exemplary implementations to limit the scope of the claimed present invention. Rather, the inventor has contemplated that the claimed present invention might also be embodied and implemented in other ways, in conjunction with other present or future technologies.

An example of an embodiment of an Efficient and Flexible Multi-Bit Halftoning may be referred to as an "exemplary multi-bit halftoner."

Introduction

The one or more exemplary implementations, described herein, of the present claimed invention may be implemented (whole or in part) by a multi-bit halftone system 100, by a printer, and/or by a computing environment. The one or more exemplary implementations, described herein, of the present claimed invention may be implemented (whole or in part) with a monotone marking engine or a multitone marking engine (printing halftones). In particular, such a marking engine by be part of a laser printer, an electrophotographic printer, or the like.

At least one implementation of the technology, described herein, performs multi-bit halftoning with hardware (e.g., circuitry) rather than a programmable processor. Furthermore, at least one implementation performs multi-bit halftoning for a variable number of bits per pixel (i.e., grayscale-depth and halftone-depth) and a variable resolution.

Exemplary Multi-bit Halftone System

Figure 1:
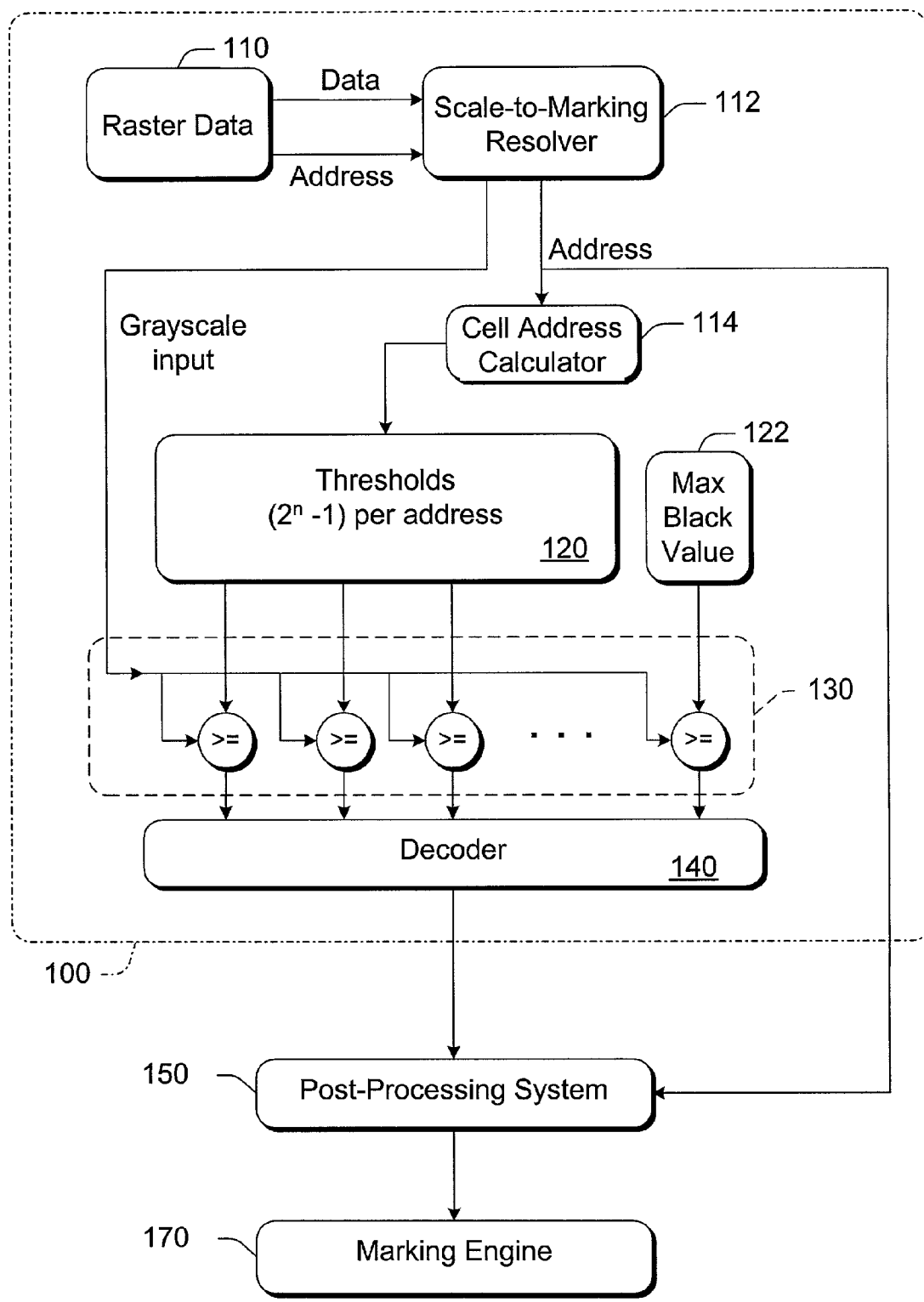
FIG. 1 is a schematic block diagram showing a multi-bit halftoning system in accordance with an implementation of the invention claimed herein.

FIG. 1 illustrates the multi-bit halftone system 100. In general, it includes a source of raster-data obtainer 110, a scale-to-marking resolver 112, a halftone cell address calculator 114, a threshold memory and loader 120 for storing thresholds, a max black value storage (or circuit) 122, a set 130 of compare units, and a decoder 140. Each of these may be embodied as part of a circuitry.

A post-processing system 150 is coupled to the multi-bit halftone system 100. It receives input from the decoder and addresses from the resolver 112. A marking engine 170 is coupled to the post-processing system 150.

The halftoning thresholds are applied in cells (i.e., tiles) across an image. The resolution of the threshold tiles is the "marking resolution." For example, the marking resolution may be the resolution that the marking engine is generating—which could be its native resolution or derived resolution. The resolution of the grayscale image is typically less than or equal to the marking resolution. In order to get the grayscale image to the marking resolution, the image is scaled. The thresholds are then applied according to the position within the pre-selected tile. Therefore, only enough thresholds to cover the selected tile need to be stored in the threshold memory and loader 120. A memory size can be chosen to file the maximum anticipated tile size.

A tile address generation hardware is included to generate the address for the threshold memory. That is the cell address calculator 114.

The raster-data obtainer 110 may obtain grayscale raster data from a buffer, a memory, a signal from a computer, and the like. The raster-data obtainer 110 may be a storage unit that stores raster data. The raster data includes the raster of pixels and their associated grayscale values. Unlike the conventional multi-bit halftoning systems, the resolution range of this raster data may be any resolution that the marking engine 170 supports. Unlike the conventional, the multi-bit halftone system 100 supports a range of the grayscale-depths. It may be one bit, two bit, three bit, and so forth. Unlike the conventional, the multi-bit halftone system 100 supports a range of the halftone-depths. It may be one bit, two bit, three bit, and so forth.

The scale-to-marking resolver 112 (i.e., resolver or scale resolver) receives the raster data from the raster-data obtainer 110. More specifically, it receives the raster address and grayscale value of each pixel of the raster data. Since the scale of the raster data might not match the desired resolution of the marking engine 170, the resolver 112 scales the raster data. It converts the resolution. For example, the 100 dpi raster data may be scaled to be printed on a 600 dpi resolution.

Typically, the raster data is scaled simply by repeating the grayscale data (both horizontally and vertically) to get the desired marking resolution. Alternatively, an interpolation scheme may be employed—such as bicubic or bilinear interpolation.

The halftone cell address calculator 114 translates the scaled raster address (after scaling by resolver 112) into a threshold (or tile) address. If the tiles are rectangular, the translation may be a modula divide of the tile dimensions. These dimensions may be stored in registers in the hardware. However, the cells may be more complicated shapes. For example, it may have a diamond shape.

To handle any shape of a tile, an approach may include a table (2 dimensional array) indexed by the halftone tile row number. The tile row number is determined by taking the scaled raster row address and modula dividing it by the number of lines in the halftone tile. For each line in the halftone tile (and thus in each addressable location in the line table), the following information may be stored in a "halftone tile table" in memory:

the number of columns in the current halftone tile line;
the address of the threshold memory where this halftone tile row starts (the columns within a row exist in sequential memory locations);
the tile line number that is jumped to when the current one is completed.

Another table (# entries=number lines in the halftone tile) is kept to define the starting position of each subsequent line. This table is the "start position table" and it may contain:

the tile line number (or index into the halftone tile table);
the column number that is started at when the start of the raster line (e.g., starting offset)
Using the line table, the threshold memory address generation may proceed as follows:determine index into start position table by taking scaled raster row address modula dividing it by the number of halftone tile rows;
get the halftone tile row number and starting column from the starting position table, and address the halftone tile table using the row number;
read the address for the threshold memory and loader 120 (halftone tile table above) and calculate the end of row pointer by adding this address to the number of columns in the row (the halftone tile table above);
If at the start of the raster line, add the starting column to the address
pass the calculated address to the threshold matrix and process the grayscale input;
increment the threshold address;
if the incremented address is less than the end of row pointer, then go back to "pass the calculated";
otherwise, take the next row index and update the pointer to the halftone tile table with this value (i.e., read the table entry pointed to by the next row index) and then jump back to "get the halftone tile row number";
if at the end of the raster line, then jump back to "determine index."

The threshold memory and loader 120 is, for example, RAM (at least in part). It contains matrix of thresholds (i.e., threshold values) having a halftone-depth. Such a matrix of thresholds is associated with a specific raster resolution and a specific grayscale-depth to halftone-depth conversion. These thresholds may be calculated based upon a specified raster resolution and a specified depth conversion. Alternatively, the thresholds may be pre-calculated based upon specified variables and loaded into memory when needed.

The dimensions of the threshold matrix match the dimensions of the raster resolution of the continuous tone image.

For example, assuming that the raster resolution is 300 dpi for a continuous tone image, the multi-bit halftone system 100 loads threshold memory and loader 120 with a 300×300 (per inch) matrix of thresholds. If, instead, the raster resolution is 600 dpi for a continuous tone image, the multi-bit halftone system 100 loads threshold memory and loader 120 with a 600×600 (per inch) matrix of thresholds.

Unlike the conventional, the depth of the halftones need not match the grayscale-depth. Using the multi-bit halftone system 100, a printer may produces multi-bit halftones having a halftone-depth that differs from the grayscale-depth of the corresponding continuous tone image.

For example, assuming that a continuous tone image has a grayscale-depth of eight bits, the multi-bit halftone system 100 may load 8-bit threshold values into the threshold memory and loader 120. However, thresholds may have different bit depths if an alignment mechanism exists to properly align the thresholds and the grayscale values of corresponding pixels.

With this flexibility, thresholds of any bit depth from 1 to B, where B is the storage size (number of bits) of the threshold values. Alternatively, the thresholds may be stored at an optimal B value (e.g., 8-bits). The grayscale input by be adjusted (e.g., by shifting left or right) by a programmable amount (e.g., a register selectable amount).

The threshold matrix allows halftoning into potentially any number of bits per pixel. The threshold matrix typically has $2^n-1$ entries, where n is the halftone-depth (i.e., bits per pixel for halftoning). The multi-bit halftone system 100 can accommodate any halftone-depth less than or equal to n.

The word width of the thresholds is $B(2^n-1)$, where B is the "threshold-depth." The threshold-depth is the maximum grayscale-depth of the grayscale data (of the continuous tone image) that the system can accommodate.

The thresholds used and stored in the threshold memory and loader 120 are used for the halftone cell or tile actually employed by a specific instance of multi-bit halftoning. The size of the cell or tile is determined when generating the line screen for the halftone. The memory needs only be large enough to hold all pixels within a tile. Example tiles include 12×12 and 16×16. In these two cases, the threshold memory would need to address 144 and 256 locations, respectively. Therefore, the memory size can be determined by the largest desired cell size.

If, for example, there is a 16×16 tile size and up to 4 bits halftone-depth. The most common grayscale-depth is 8 bits. In this example, each address location in the threshold memory would need $(2^4-1)*8=120$ bit wide memory. A 16×16 tile halftone has 256 pixels within in; therefore, the memory would need 256 threshold arrays. Therefore, the memory would be a 256×120 RAM or register bank.

The threshold memory and loader 120 receives the addresses from the cell address calculator 114. Those addresses are determined by relative position in a dither (i.e., halftone) matrix or tile.

The compare-unit set 130 receives grayscale input, which is the grayscale data of the pixel corresponding to the address being provided to the threshold memory and loader 120. The pattern of thresholds of the matrix is compared to the grayscale data of the corresponding pixels. The grayscale data of that corresponding pixel is provided to the compare units 130. The contents of the threshold memory and loader 120 are used in $2^n$ comparisons. Unlike the conventional with their sequential processors, these comparisons are performed concurrently. Thus, maximizing speed and efficiency the multi-bit halftoning determinations while introducing flexibility. Collectively or individually, the compare-units may be called a comparator.

The max black value 122 is hard-coded. It is intended to be a maximum value or a minimum value depending on the photometric interpretation of the grayscale data. Either way, it is intended to represent "black." Typically the max black value is a minimum value (e.g., zero).

The flexibility of the exemplary multi-bit halftoner is enhanced by loading the thresholds into the threshold memory and loader 120. Typically, the memory may accommodate a maximum halftone-depth (e.g., 4-bits). For example, if there are 8-bit thresholds, then each address in the threshold memory and loader 120 holds fifteen 8-bit thresholds. An example of such may be these numbers: 240, 224, 208, 192, 176, 160, 144, 128, 96, 80, 64, 48, 32, and 16. With the max black value of 0, these numbers generate all possible 4-bit combinations.

Assume that the grayscale values in the example range from 0 to 255. If, for example, there is a 3-bit halftone-depth, then the thresholds within a given address may look like this: 244, 192, 160, 128, 96, 64, 32, 0, 0, 0, 0, 0, 0, 0, and 0 (with the max black value of 0 following). In this configuration, the output would never be greater than 7 for any grayscale input (which is the maximum value for 3-bit halftone-depth).

The bits within a threshold would not be affected—just the value of thresholds with higher indices. In short, to setup for a desired halftone depth m, where m<n, set the threshold values from $2^m$ to $2^n-1$ to the max black value.

The compare units of the set 130 determine whether the grayscale input data is greater than or equal to the threshold value of the threshold memory and loader 120. Alternatively, it may be the opposite (less than or equal to). These results are fed into the decoder 140.

The decoder 140 produces an index where the grayscale input resides in the range defined by two adjacent threshold values. In the case where the max black value is a minimum (e.g., zero), Th(i−1)>grayscale input>=Th(i). In other words, grayscale value is less than Th(i−1) and greater than or equal to Th(i). Assume, for example, that the only comparison done between the grayscale input and each threshold is a greater than or equal to (>=). If this comparison is true, then the comparitor returns a '1' and if not (i.e., grayscale input is less than the threshold), the comparitor returns a '0'.

Assume, for example, that the comparitor's result is C(i), where i is the index of the comparitor. Therefore, the halftone value is determined where C(i)='1' and C(i−1)='0'. C(−1) is always '0'. If the opposite photometric interpretation is used (e.g., max black value is a maximum value), then the max black value is set to a maximum and all the comparison results are inverted.

These results specify the relative size of the subpixel and full pixel marks in a multi-bit halftone representation of a continuous tone image of the raster data.

The post-processing system 150 of the multi-bit halftone system 100 is performed in a manner that is not inconsistent with conventional multi-bit halftoning. The results are examined and subpixel marks may be moved within the pixel region. In addition, some compression (or packing) may be performed.

The marking engine 170 is the conventional marking engine of, for example, a laser printer. It prints the halftoned representation of a continuous tone image of the raster data.

Methodological Implementation of the Exemplary Multi-bit Halftoning

Figure 2:
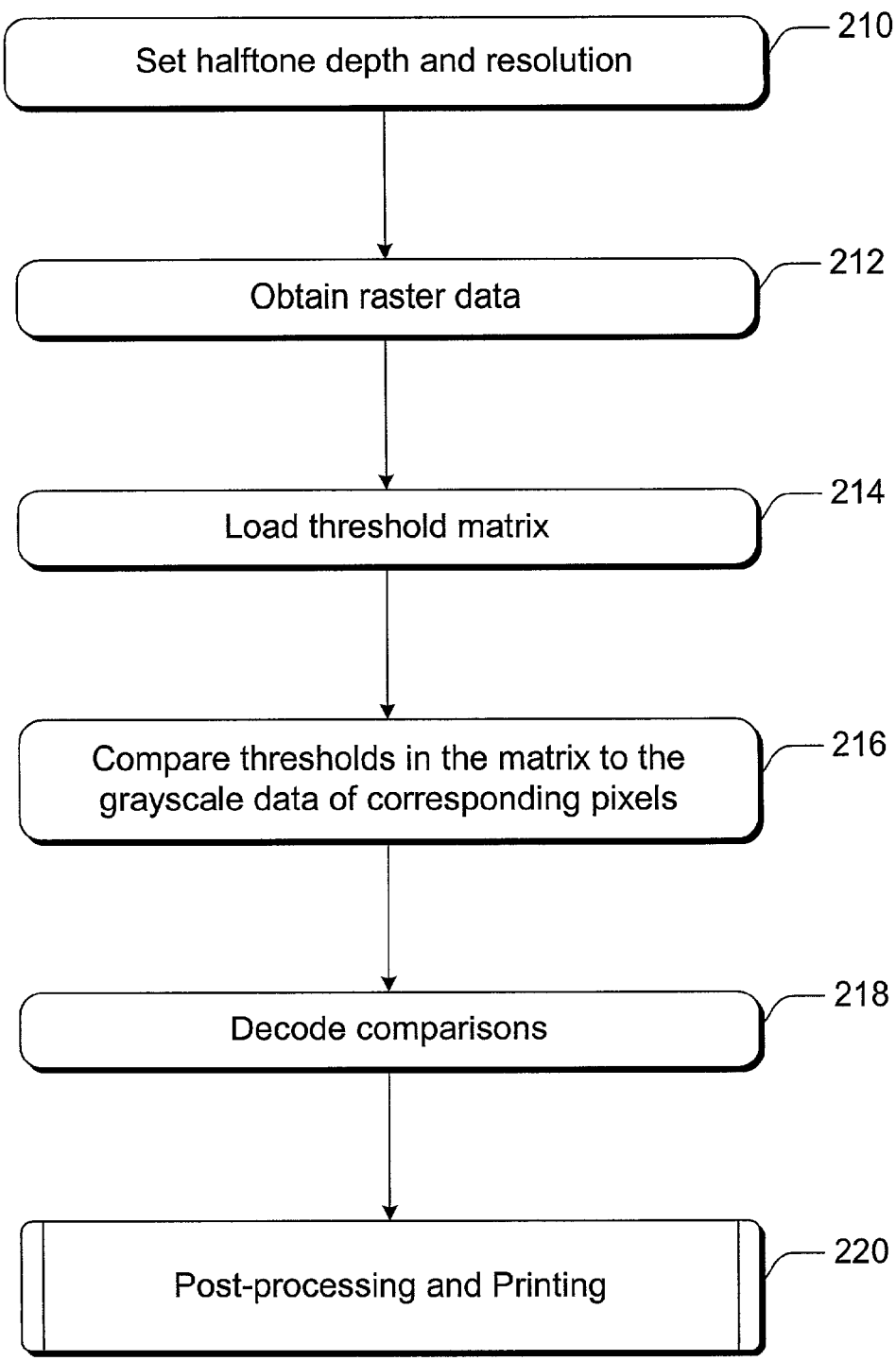
FIG. 2 is a flow diagram showing a methodological implementation of the invention claimed herein.

FIG. 2 shows methodological implementation of the exemplary multi-bit halftoner performed by the multi-bit halftone system 100 (or some portion thereof). This methodological implementation may be performed in hardware.

At 210, the exemplary multi-bit halftoner sets the halftone-depth and resolution. At 212, the raster data is retrieved. This raster data is of a continuous tone image that is to be halftoned and printed. The raster data has a raster resolution. Each pixel of the raster data has a grayscale-depth. At 212, the data is scaled and cell addresses are calculated as described above.

At 214, the threshold matrix is loaded. This matrix be loaded from pre-calculated tables or it may be generated when needed. Either way, the dimensions and depth of the matrix is based (at least, partially) on the resolution and grayscale and halftone-depth of the raster data.

At 216, the thresholds of the matrix are compared to the grayscale data of the corresponding pixels. At 218, the comparisons are decoded.

At 220, the decoded comparisons are further processed and the halftoned representation of the continuous tone image is printed by a marking engine.

Hardware-Based

The exemplary multi-bit halftoner includes hardware-based logic (i.e., circuitry). It may be in the form of an application-specific integrated circuit (ASIC). An example of the term "hardware-based" includes at least one physical logic component that does not retrieve and execute instructions from program memory. Rather, this exemplary physical logic component has dedicated, interconnected logic elements that process signals and data. Although hardware-based logic such as this is less flexible than a microprocessor or other instruction-based processors, hardware-based logic is much faster than instruction-based logic.

Moreover, such hardware-based logic is faster than an interrupt-driven processor because it need not rely on reception of interrupts and interpreting such interrupts to perform a task. Therefore, such hardware-based logic may perform functions between clock cycles (such as those for a bus or processor).

Based upon its ordinary meaning and the description provided herein, those of ordinary skill in the art understand the meaning of "hardware-based."

Exemplary Printer Architecture

Figure 3:
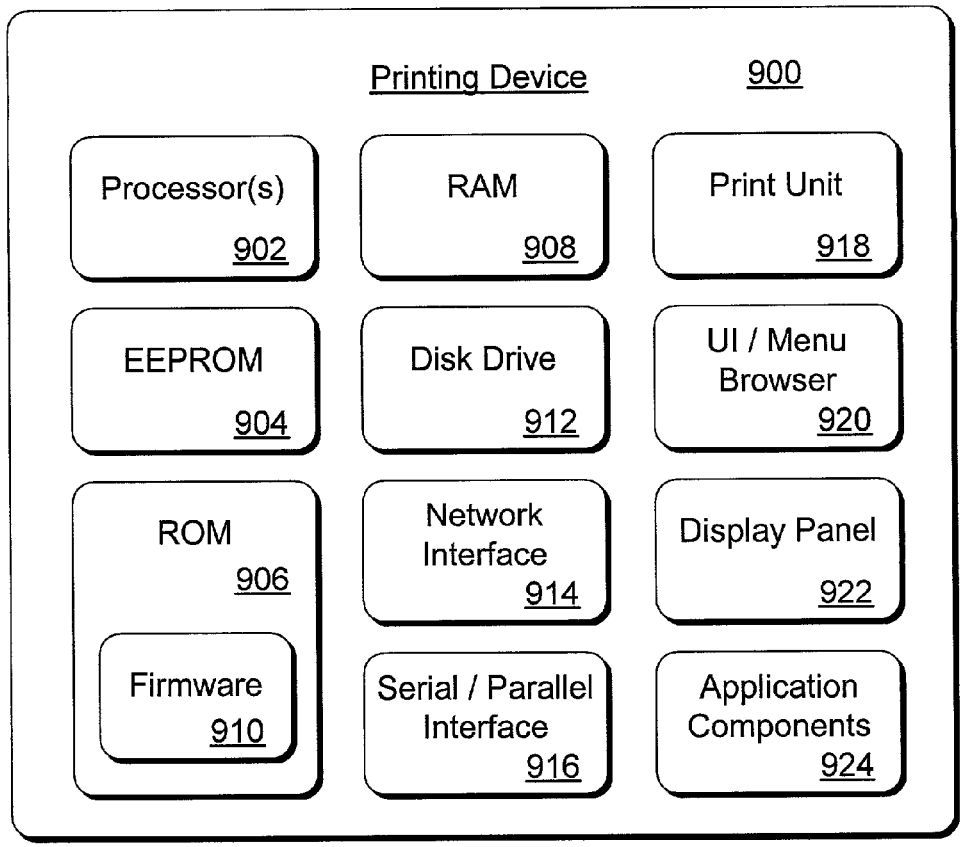
FIG. 3 is an example of a printing device capable of implementing an embodiment (wholly or partially) of the invention claimed herein.

FIG. 3 illustrates various components of an exemplary printing device 900 that can be utilized to implement the inventive techniques described herein. Printer 900 may include one or more processors 902, an electrically erasable programmable read-only memory (EEPROM) 904, ROM 906 (non-erasable), and a random access memory (RAM) 908. Although printer 900 is illustrated having an EEPROM 904 and ROM 906, a particular printer may only include one of the memory components. Additionally, although not shown, a system bus typically connects the various components within the printing device 900.

The printer 900 also has a firmware component 910 that is implemented as a permanent memory module stored on ROM 906. The firmware 910 is programmed and tested like software, and is distributed with the printer 900. The firmware 910 can be implemented to coordinate operations of the hardware within printer 900 and contains programming constructs used to perform such operations.

Processor(s) 902 process various instructions to control the operation of the printer 900 and to communicate with other electronic and computing devices. The memory components, EEPROM 904, ROM 906, and RAM 908, store various information and/or data such as configuration information, fonts, templates, data being printed, and menu structure information. Although not shown, a particular printer can also include a flash memory device in place of or in addition to EEPROM 904 and ROM 906.

Printer 900 also includes a disk drive 912, a network interface 914, and a serial/parallel interface 916. Disk drive 912 provides additional storage for data being printed or other information maintained by the printer 900. Although printer 900 is illustrated having both RAM 908 and a disk drive 912, a particular printer may include either RAM 908 or disk drive 912, depending on the storage needs of the printer. For example, an inexpensive printer may include a small amount of RAM 908 and no disk drive 912, thereby reducing the manufacturing cost of the printer.

Network interface 914 provides a connection between printer 900 and a data communication network. The network interface 914 allows devices coupled to a common data communication network to send print jobs, menu data, and other information to printer 900 via the network. Similarly, serial/parallel interface 916 provides a data communication path directly between printer 900 and another electronic or computing device. Although printer 900 is illustrated having a network interface 914 and serial/parallel interface 916, a particular printer may only include one interface component.

Printer 900 also includes a print unit 918 (e.g., a marking engine like engine 170) that includes mechanisms arranged to selectively apply a marking medium (e.g., liquid ink, toner, etc.) to a print media such as paper, plastic, fabric, and the like in accordance with print data corresponding to a print job. For example, print unit 918 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner.

Print unit 918 can also be configured to support duplex printing, for example, by selectively flipping or turning the print media as required to print on both sides. Those skilled in the art will recognize that there are many different types of print units available, and that for the purposes of the present invention, print unit 918 can include any of these different types.

Printer 900 also includes a user interface and menu browser 920, and a display panel 922. The user interface and menu browser 920 allows a user of the printer 900 to navigate the printer's menu structure. User interface 920 can be indicators or a series of buttons, switches, or other selectable controls that are manipulated by a user of the printer. Display panel 922 is a graphical display that provides information regarding the status of the printer 900 and the current options available to a user through the menu structure.

Printer 900 can, and typically does include specific hardware-based components 924 that provide a fast and efficient execution of tasks at a hardware level (as opposed to sequential steps performed by the processor(s) 902. The multi-bit halftone system 100 is one example of such a specific hardware-based component.

Exemplary Computer Architecture

Figure 4:
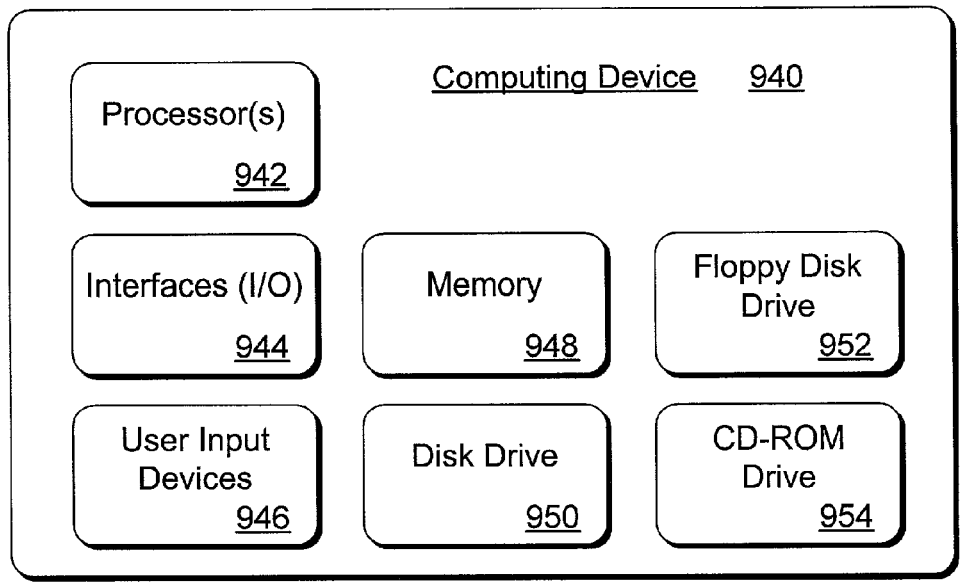
FIG. 4 is an example of a computing device capable of operating with an embodiment (wholly or partially) of the invention claimed herein.

FIG. 4 illustrates various components of an exemplary computing device 940 that can be utilized to implement the inventive techniques described herein. Computer 940 includes one or more processors 942, interfaces 944 for inputting and outputting data, and user input devices 946. Processor(s) 942 process various instructions to control the operation of computer 940, while interfaces 944 provide a mechanism for computer 940 to communicate with other electronic and computing devices. User input devices 946 include a keyboard, mouse, pointing device, or other mechanisms for interacting with, and inputting information to computer 940.

Computer 940 also includes a memory 948 (such as ROM and/or RAM), a disk drive 950, a floppy disk drive 952, and a CD-ROM drive 954. Memory 948, disk drive 950, floppy disk drive 952, and CD-ROM drive 954 provide data storage mechanisms for computer 940. Although not shown, a system bus typically connects the various components within the computing device 940.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A hardware-based multi-bit halftoning system for use with a marking engine, the system comprising:
   a raster-data obtainer circuitry configured to obtain raster data, the data including pixels and their grayscale values;
   a threshold memory configured to store a matrix of threshold values;
   a threshold loader circuitry configured to load the threshold memory with the matrix such that the resolution of the loaded matrix matches the resolution of the raster data; and
   a comparator circuitry configured to concurrently compare the threshold values of multiple entries in the matrix to the grayscale values of corresponding multiple pixels of the raster data.

2. A system as recited in claim 1, further comprising:
   a scale resolver circuitry configured to receive raster data from the obtainer circuitry and converts resolution scale of raster data to a specified resolution scale of a marking engine;
   a halftone-cell address calculator circuitry configured to translate addresses of the scaled raster data into threshold addresses.

3. A system as recited in claim 1, wherein the threshold values have a halftone-depth and the grayscale data has a grayscale-depth.

4. A system as recited in claim 1, wherein the threshold values have a halftone-depth and the grayscale data has a grayscale-depth and wherein the grayscale-depth does not match the halftone-depth.

5. A system as recited in claim 1 further comprising a threshold loader circuitry configured to load the threshold memory with the matrix, wherein the threshold values have a halftone-depth and the grayscale data has a grayscale-depth and wherein the grayscale-depth does not match the halftone-depth.

6. A system as recited in claim 1 further comprising a decoder circuitry configured to decode the comparisons of the comparator circuitry to generate an index of pixel locations of the raster data where the grayscale data is between adjacent threshold values.

7. A system as recited in claim 1, wherein threshold matrix forms a dithering pattern.

8. A system as recited in claim 1, wherein the hardware-based memory management system is embodied as, at least part of, an application specific integrated circuit (ASIC).

9. A hardware-based multi-bit halftoning system for use with a marking engine, the system comprising:
   a raster-data obtainer circuitry configured to obtain raster data, the data including pixels and their grayscale values;
   a threshold memory configured to store a matrix of threshold values;
   a threshold loader circuitry configured to load the threshold memory with the matrix such that the resolution of the loaded matrix matches the resolution of the raster data; and
   a comparator circuitry configured to compare threshold values of the matrix to grayscale values of corresponding pixels of the raster data.

10. A system as recited in claim 9, wherein the comparator circuitry is further configured to concurrently compare the threshold values of multiple entries in the matrix to the grayscale values of corresponding multiple pixels of the raster data.

11. A system as recited in claim 9, wherein the threshold values have a halftone-depth and the grayscale data has a grayscale-depth and wherein the grayscale-depth does not match the halftone-depth.

12. A system as recited in claim 9 further comprising a threshold loader circuitry configured to load the threshold memory with the matrix, wherein the threshold values have a halftone-depth and the grayscale data has a grayscale-depth and wherein the grayscale-depth does not match the halftone-depth.

13. A system as recited in claim 9 further comprising a decoder circuitry configured to decode the comparisons of the comparator circuitry to generate an index of pixel locations of the raster data where the grayscale data is between adjacent threshold values.

14. A system as recited in claim 9, wherein threshold matrix forms a dithering pattern.

15. A system as recited in claim 9, wherein the hardware-based memory management system is embodied as, at least part of, an application specific integrated circuit (ASIC).

16. With a hardware-based multi-bit halftoning module configured to flexibly and efficiently halftone raster data containing a continuous tone image, a method comprising:
    setting halftone-depth and resolution of threshold matrix;
    obtaining raster data, the data including pixels and their grayscale values;
    loading the threshold matrix with threshold values such that the resolution of the loaded matrix matches the resolution of the raster data; and
    comparing thresholds in the matrix to the grayscale data of corresponding pixels of the raster data.

17. A method as recited claim 16, wherein during the comparing, the threshold values of multiple entries in the matrix are concurrently compared the grayscale values of corresponding multiple pixels of the raster data.

18. A method as recited in claim 16, wherein the threshold values have a halftone-depth and the grayscale data has a grayscale-depth and wherein the grayscale-depth does not match the halftone-depth.

19. A method as recited claim 16 further comprising decoding the results of the comparing to generate an index of pixel locations of the raster data where the grayscale data is between adjacent threshold values.

* * * * *